S. HETFIELD.
Stock-Frames for Platform-Scales.

No. 148,456. Patented March 10, 1874.

Witnesses: A. W. Gillfillan, F. A. Gillfillan

Inventor: Seely Hetfield

UNITED STATES PATENT OFFICE.

SEELY HETFIELD, OF WATSEKA, ILLINOIS.

IMPROVEMENT IN STOCK-FRAMES FOR PLATFORM-SCALES.

Specification forming part of Letters Patent No. 148,456, dated March 10, 1874; application filed May 8, 1873.

*To all whom it may concern:*

Be it known that I, SEELY HETFIELD, of Watseka, in the county of Iroquois and State of Illinois, have invented certain Improvements in Stock-Frames for Confining Stock on Platform-Scales for the purpose of weighing the same, of which the following is a specification:

My invention relates to the combination of a movable stock-frame and rollers or wheels, in such manner that the movable cattle or stock frame shall rest upon and be supported by the rollers or wheels, thus enabling the weigher to roll the stock-frame upon the scales when wishing to weigh stock, and roll off the frame to one side when the scale is needed for other purposes. The stock-frame when rolled upon the platform of the scale is secured in position by means of pointed iron rods working vertically in eyes or staples, and driven into the platform, or dropped into holes previously made in the platform.

Figure 1:
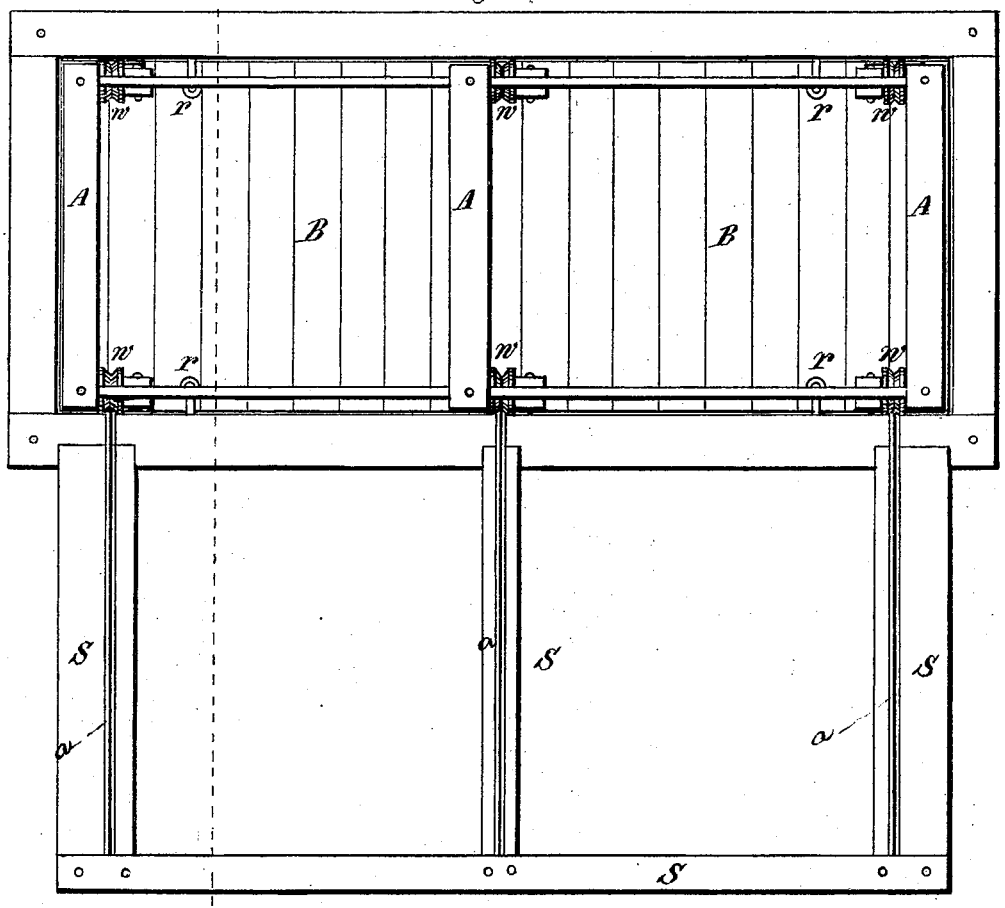
Figure 2:
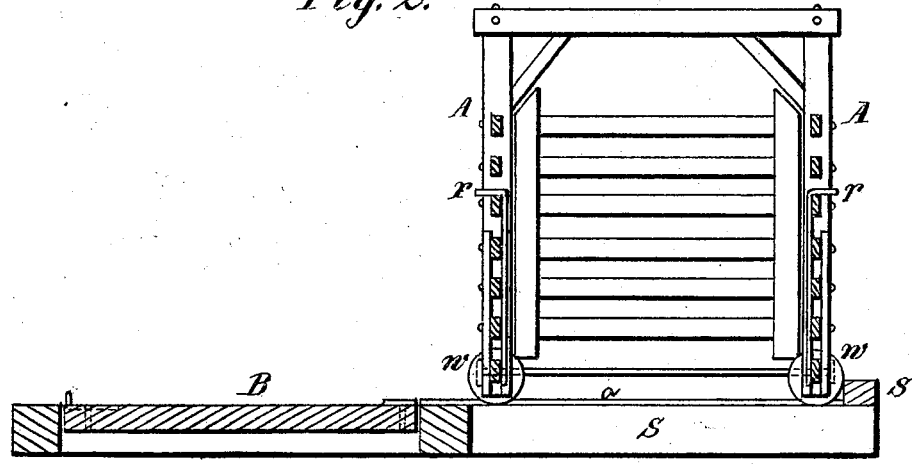

Figure 1 represents a plan view of the stock-frame and the scales, the frame being rolled upon the scales. Fig. 2 represents a section of the frame and the scales, the frame being off the scales.

A is the stock-frame, which should be substantially constructed with cross sills or bars and connecting-rods at the bottom. B is the platform of the scale, upon which the stock-frame A is conveyed by the wheels W. W are wheels or rollers upon which the stock-frame A is supported and moved. r r are the pointed iron rods used to fasten the stock-frame A in position when on platform B. S S are sills or the floor upon which the stock-frame A is rolled at the side of the scales when not in use, or when the scale is in use for weighing other articles than stock. This frame S is provided with tracks a a, and the rollers W W are grooved, so that the stock-frame can be easily rolled on and off from the scales, as desired. The frame A is provided with a door at one or both ends for the ingress and egress of the cattle.

This frame is placed on the frame S, and the cattle driven into the frame or pen A. This frame is then pushed onto the scale B, and the rods r r are forced down, so that their ends enter perforations in the scale-platform, so as to hold the frame A thereto. The cattle are then weighed in the usual way, after which the frame is drawn back onto the frame S and the cattle let out.

What I claim is—

The combination with the bed-frame S with tracks a a, the scale B, and the stock frame or pen A, with grooved rollers W W and fastening-rods r r, all constructed substantially as and for the purposes set forth.

SEELY HETFIELD.

Witnesses:
A. M. GILLFILLAN,
F. A. J. GILLFILLAN.